Patented June 10, 1930

1,762,690

UNITED STATES PATENT OFFICE

JOSEPH L. KOPF, OF EAST ORANGE, NEW JERSEY, ASSIGNOR TO JABEZ BURNS & SONS, INC., OF NEW YORK, N. Y., A CORPORATION OF NEW YORK

COFFEE PRODUCT AND METHOD OF MAKING SAME

No Drawing.   Application filed December 30, 1926.   Serial No. 158,131.

This invention relates to a new coffee product and a method for making the same.

The normal methods of grinding coffee reduce the beans to granules of various sizes mixed with finely-powdered coffee and pieces of chaff.

From the standpoint of appearance such a mixture is undesirable; the ideal being a uniform granulation in which no particles are substantially larger or smaller than the desired size, and which is not marred by flakes of light-colored chaff.

Upon infusion, however, such uniform granulation would produce a beverage of inferior quality because a certain percentage of finely-powdered coffee is necessary to hold back the water and keep it in contact with the coffee particles long enough for proper and complete infusion. Finely-divided chaff is also desirable for the same reason as it tends to form a "filter-mat" for percolation.

One purpose of my invention is to achieve a product of uniformly-granulated appearance without sacrifice of the finely-divided material necessary for proper infusion.

The present method of grinding coffee, known as "granulating" or "steel-cutting" attempts to approximate the ideal condition (1) by the use of special cutting rolls to minimize the production of fine coffee, (2) by sifting the product, to limit the maximum size of the granules, and re-grinding all those too large to pass through the sieve; (3) by permanently removing the chaff by means of a suction device; and (4) by separating the fine coffee and thoroughly re-mixing it with the granulated goods in the proper proportion.

The advantages of this method roughly approach the ideal temporarily, but they are destroyed by the unavoidable vibration and jarring of the packaged coffee in its transit from factory to consumer. Such vibration separates the larger and the smaller particles in each package into alternate layers of clean-cut granules and powder-fine coffee. Thus the appearance of uniformity is lost, because the presence of both coarse and fine particles is made conspicuous by the separation into layers; and the desirable qualities for infusion are destroyed, because a measure of coffee, taken from the package for brewing, may contain too much or too little of the fine material to produce a beverage of good cup quality.

Another unsatisfactory feature of the "steel-cutting" method is the loss of approximately 1% by weight due to the removal of chaff—which is a desirable ingredient of ground coffee for reasons already stated.

A second purpose of this invention is to make a ground-coffee product in which an evenly-granulated appearance and the conditions necessary for proper infusion are maintained uniformly throughout each package for an indefinite time and regardless of rough treatment in shipping and handling.

A third purpose of my invention is to obtain a ground-coffee product of uniform appearance in which the normal chaff content is retained.

Briefly, my invention aims to put the fine coffee and chaff into the product in such form that the advantages of their presence are achieved without any of the disadvantages. It is, broadly speaking, to remove separately the fine coffee and chaff from the mixture which results from the usual grinding methods. They are then ground up, together or separately, to a very fine degree—almost to pulverization. Thereafter they are bound together to form granules of the desired size. These artificially-produced granules are then mixed with normally-produced granules from which the fine coffee and chaff have been removed.

The binder used is a water soluble, physiologically inactive, neutral, non-deliquescent material such as gum acacia, gelatin, albumen, casein or the like.

In this manner the fine coffee and chaff are retained in the finished product in their normal proportions. The entire product is made up of granules of substantially the same size and so presents the uniform appearance throughout which is attractive to the trade and to consumers. The uniformity of the granules prevents stratification and consequent variation in the cup quality of the beverage.

By selecting a binder with the properties mentioned above, the quality of the coffee is not affected and the formed granules will remain intact indefinitely.

More specifically the coffee beans are ground by any usual method and the maximum size of granules is limited, by screening and returning over-size particles for regrinding.

At the same time (or as a separate operation) the fine coffee and chaff are removed, preferably separately, by air suction and screening or other suitable means. They are then passed together through a pulverizing mill in approximately the proportions in which they were removed (about 9 parts fine coffee to one part chaff), passing thereafter to a hopper. They are now in a very finely-divided condition and intimately mixed. It is understood that the chaff can be left out entirely if desired and the formed granules made up of fine coffee alone.

The binder solution is then prepared, as by stirring 5 parts by weight of gum acacia into 55 parts by weight of water. Sixty-six parts by weight of the mixture of fine chaff and coffee are then placed in a mixing machine with sixty parts by weight of the binder solution and mixed together. After being thoroughly mixed it is found that the mass is almost dry and ready to be granulated.

The granulation of this almost-dry mixture is effected preferably by brushing it lightly over a plate in which there are apertures of a desired size. As the material passes through these apertures, it drops in the form of granules of approximately correct size on to a platform whence it is passed to a dryer. The apertures are preferably #5½ size.

The dried granules are then passed back to the screens over which the ground coffee is continuously being graded and, if of the right size, they pass through with the normal granules and are discharged as finished goods. If too large, they are returned with the tailings for regrinding and if too small they are removed with the fine-coffee and re-formed.

This application is related to my co-pending application S. N. 138,876, filed Oct. 1, 1926, entitled coffee product and method of making it. As in this copending application, the present application concerns a product and a method of making it which relates to other substances besides coffee. Such other substances may be chicory, cereals, and cereal coffee substitues.

I claim:

1. A coffee product comprising a plurality of coffee granules of uniform size, certain of which granules are formed of fine coffee held together by an edible non deliquescent binder, the amount of fine coffee thus formed into granules being proportionate to the amount of fine coffee produced in the normal granulation of the coffee beans.

2. Coffee formed entirely of granules of approximately the same size, certain of which comprise steel-cut granules and others of which comprise granules of fine coffee bound together by an edible non-deliquescent material.

3. Coffee formed entirely of granules of approximately the same size, certain of which comprise fine coffee bound together with gum acacia.

4. A method of making granulated coffee including the step of forming the fine coffee produced during granulation into granules of the size of those normally produced in the granulation, and returning the granules thus formed to those normally produced in the same proportion as the fine coffee is normally produced in the granulation.

5. A method of making granulated coffee comprising granulating coffee beans, removing the fine coffee and chaff from the granulated material, mixing sixty-six parts by weight of the fine coffee and chaff with fifty-five parts by weight of water and five parts by weight of gum acacia, forming this mixture into granules of approximately the same size as those normally produced in the granulation and then mixing the granules thus formed with the normally produced granules.

Signed at New York, in the county of New York and State of New York, this 24th day of December, A. D. 1926.

JOSEPH L. KOPF.